United States Patent [19]

Firoozmand et al.

[11] Patent Number: 5,043,981

[45] Date of Patent: Aug. 27, 1991

[54] METHOD OF AND SYSTEM FOR TRANSFERRING MULTIPLE PRIORITY QUEUES INTO MULTIPLE LOGICAL FIFOS USING A SINGLE PHYSICAL FIFO

[75] Inventors: Farzin Firoozmand, Cupertino; Brian Childers, Santa Clara, both of Calif.

[73] Assignee: Advanced Micro Devices, Inc., Sunnyvale, Calif.

[21] Appl. No.: 529,366

[22] Filed: May 29, 1990

[51] Int. Cl.⁵ .............................................. H04J 3/02
[52] U.S. Cl. .............................. 370/85.1; 370/85.15; 370/85.4; 370/85.6
[58] Field of Search ................... 370/85.1, 85.12, 85.4, 370/85.5, 85.6, 85.15, 94.1, 79, 1, 4, 95.1; 340/825.5, 825.51

[56] References Cited

U.S. PATENT DOCUMENTS

| | | | |
|---|---|---|---|
| 4,667,323 | 5/1987 | Engdahl et al. | 370/85.4 |
| 4,866,704 | 9/1989 | Bergman | 370/85.5 |
| 4,914,652 | 4/1990 | Nguyen | 370/85.5 |
| 4,930,121 | 5/1990 | Shiobara | 370/85.4 |

Primary Examiner—Douglas W. Olms
Assistant Examiner—H. Kizou
Attorney, Agent, or Firm—Lowe, Price, Leblanc and Becker

[57] ABSTRACT

An FDDI system and method for transmitting to an optical medium, upon receipt of token, frames of synchronous data and frames of asynchronous data having different levels of priority. The network on which the FDDI is implemented includes a plurality of processors each having a system for storing the frames of data in queues corresponding to priority, and an output buffer configured to have a plurality of logical FIFOs corresponding to the queues. Data is transferred one queue at a time from the system memory to the output buffer through a single physical FIFO. To prevent the FIFO from "locking-up" as a result of any residual data remaining therein following each transfer of a frame to the output buffer, storage remaining available for a particular queue of the output buffer to be transmitted to the medium is detected. Data is transferred from the system memory to the FIFO memory only if the storage remaining available is at least equal to the storage capacity of the FIFO memory.

20 Claims, 11 Drawing Sheets

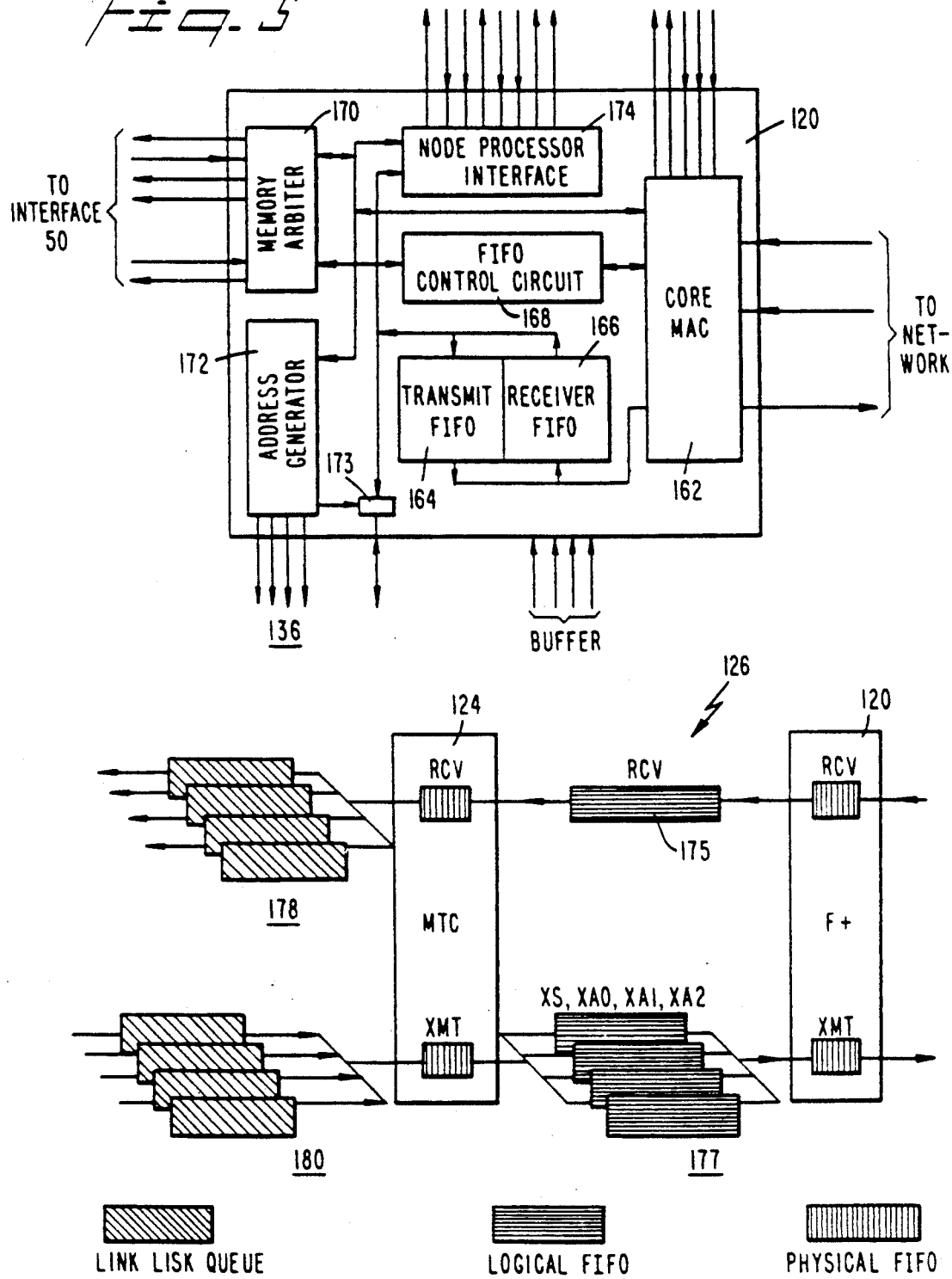

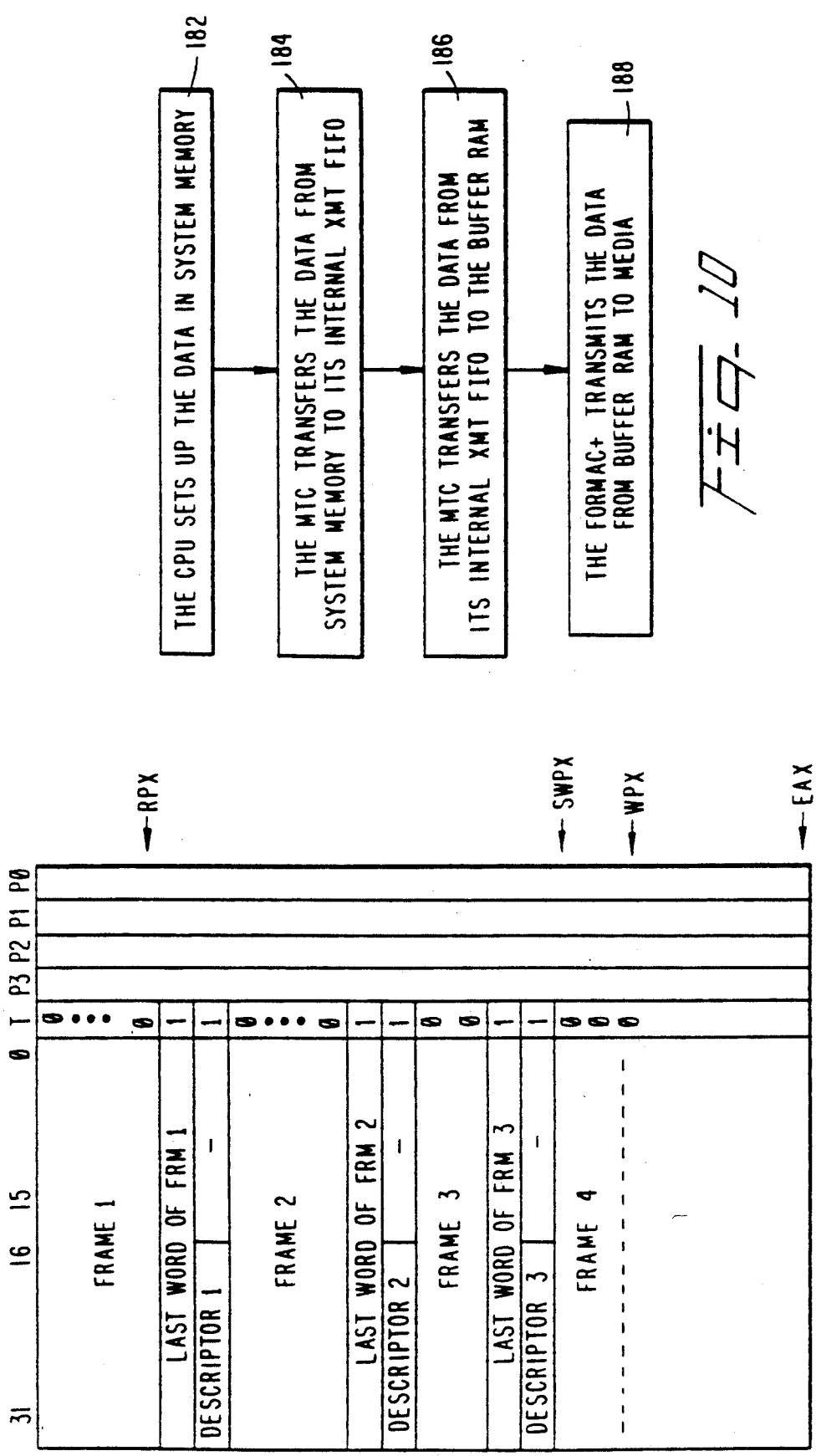

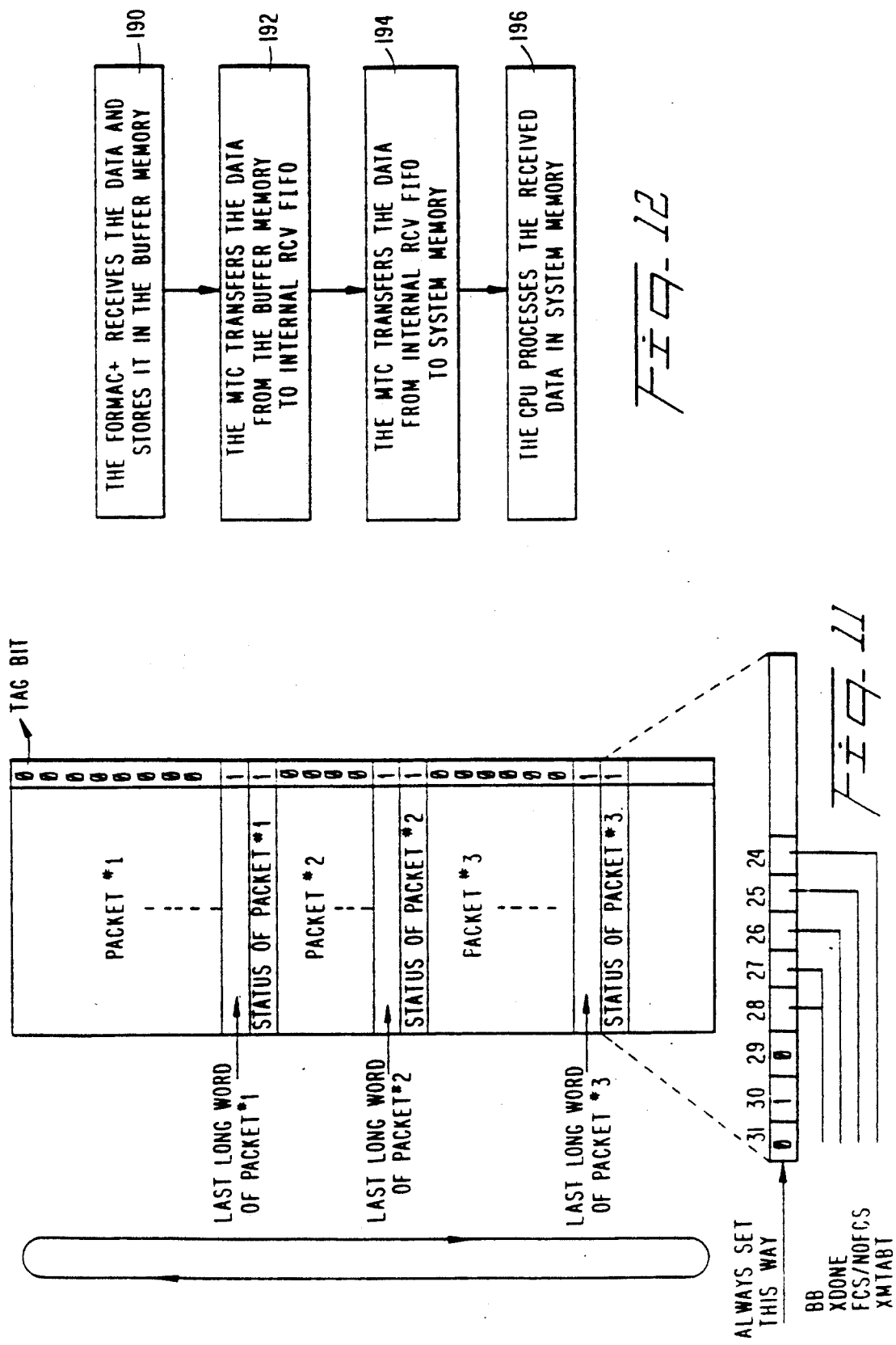

METHOD OF AND SYSTEM FOR TRANSFERRING MULTIPLE PRIORITY QUEUES INTO MULTIPLE LOGICAL FIFOS USING A SINGLE PHYSICAL FIFO

CROSS-REFERENCES TO RELATED APPLICATIONS

This application is related to the following co-pending applications, owned by the assignee of this invention, and filed on even date herewith:

1) Firoozmand, Ser. No. 07/529,364, , for "FDDI Controller Having Flexible Buffer Management", 2) Firoozmand, Ser. No. 07/529,362, for "Memory Management System and Method for Network Controller".

3) Firoozmand et al., Ser. No. 07/529,365, , for "Method of and System for Implementing Multiple Levels of Asynchronous Priority in FDDI Networks", 4) Firoozmand, Ser. No. 07/529,363, , for "Configuration of SRAMS as Logical FIFOS for Transmission and Receive of Packet Data".

TECHNICAL FIELD

This invention relates generally to data manipulation, and more particularly, to a method of and system for transmitting a plurality of queues of data from one location to another, through a single FIFO memory. The invention has particular utility in an FDDI network handling queues of data having different levels of priority.

BACKGROUND ART

In data manipulation systems handling packets of data arranged in frames (a packet, or burst, of data including certain framing, or "housekeeping" bits is defined as a "frame"; data sent in the from of frames is termed "framed data"), there is often a requirement to send the framed data from one set of queues at one location to a second set at another location. For example, in a network of a type described in copending application (1), supra, for "FDDI Controller Having Flexible Buffer Management", incorporated herein by reference, there is a network controller comprising a bus master architecture wherein queues of framed data are transferred from buffers established in a system memory to corresponding regions formed by logical FIFOs in an output buffer for transmission to a network. Between the system memory and the output buffer is a physical FIFO having a predetermined storage capacity, e.g., 32 bytes, for storing the framed data temporarily en route to the output buffer. One purpose of the physical FIFO is to provide buffering of data that is required as a result of differences in the clock rates of system and network clocks.

The queues of data handled by the FDDI network controller are transferred from buffer regions in the system memory to the output buffer, one frame at a time, in response to a request for transmission to the network upon receipt of a "token" (in FDDI, the network is composed of an optical medium) and data available for transmission. The queues of data are stored in corresponding queues formed by "logical FIFOs" in the output buffer.

Data is transferred in order of priority beginning with the highest until no additional data having the same priority is available for transmission or the unexpired token holding time (THT) during receipt of the token have become less than a threshold value for that priority. Details on this protocol are given in copending application (3), supra, for "Method of and System for Implementing Multiple Levels of Asynchronous Priority in FDDI Networks", incorporated herein by reference.

Following each transfer of framed data from the system memory, through the physical FIFO, to the output buffer, a decision is made either to transfer additional data having the same priority to the physical FIFO to thereafter be transferred to the same output buffer queue, or to transfer data having a different priority to the physical FIFO, if any additional data is available, to thereafter be sent to another output buffer queue.

However, a condition termed "locking-up" of the physical FIFO will tend to occur, making further transfer of data through the FIFO impossible, unless the FIFO is "flushed". Locking-up occurs when a queue in the output buffer is "almost full", that is, when the amount of storage remaining available in the logical FIFO containing that queue, is less than the storage capacity of the physical FIFO. When this occurs, the physical FIFO does not completely empty of data having the current priority as data having a different level of priority begins to be transferred to it from the system memory. Locking-up occurs because the residual data stored in the physical FIFO cannot be transferred to the new output buffer queue because the new queue has a level of priority different from that of the residual data in the FIFO. This phenomenon must be prevented from occurring, and at the same time, any available data must be transferred to the physical FIFO immediately when the current queue is not "almost full", to optimize the operating speed of the network.

DISCLOSURE OF THE INVENTION

Accordingly, one object of the invention is to prevent "locking-up" of a single FIFO through which framed data passes from queues at one location to corresponding queues at another, wherein different queues contain data having different characteristics.

Another object of the invention is to prevent "locking-up" of a single FIFO through which framed data passes from queues at one location to corresponding queues at another, wherein different queues contain data having different levels of priority.

Another object of the invention is to prevent, in the bus interface of an FDDI network, "locking-up" of a single FIFO through which framed data passes from queues at one location to corresponding queues at another, wherein different queues contain framed data having different levels of priority.

Still another object is to optimize the operating speed of an interface of the type described by transferring available data from the system memory to the physical FIFO immediately when the current queue is determined to be not "almost full".

The above and other objects of the invention are satisfied by a network adapter including a plurality of processors and system memories each storing frames of data arranged in a plurality of different queues. The frames of each queue have a priority different from the priorities of frames of data of the other queues. Transmission of the frames of data to the network are controlled by an output buffer memory configured to receive the queues in a plurality of first in-first out (FIFO)

memory regions for storing respectively the plurality of queues of framed data to be transmitted to the network.

A FIFO memory establishes a single signal flow path for the framed data between the system memory and the output buffer memory. Flow of framed data is controlled, one queue at a time in order of priority, through the FIFO memory, to corresponding FIFO regions of the output buffer. The framed data, stored in respective output FIFO regions of the output buffer memory, then is transferred to the network. Preferably, the FIFO memory has a predetermined data storage capacity and transfer of framed data from the system memory to FIFO memory and transfer of framed data from the FIFO memory to the output buffer memory is controlled such that the FIFO memory is always exhausted of data following every transfer of framed data from the FIFO memory to the output buffer memory.

In accordance with a particular aspect of the invention, the amount of data storage remaining available for a particular queue of the output buffer memory currently receiving data of a particular priority to be transmitted to the network is determined. Framed data is transferred from the system memory to the FIFO memory only when the data storage remaining available for the particular queue is not less than the data storage capacity of said FIFO memory.

In the preferred embodiment, a data flow controller detects an "almost full" condition of a particular queue of the output buffer memory receiving framed data of a particular priority when the amount of storage remaining available for the particular queue is not greater than the predetermined storage capacity of the FIFO memory. In response to the "almost full" condition, the controller terminates transfer of data from the system memory to the FIFO memory and initiates transfer of data, having a different priority, from the system memory, through the FIFO memory, to a different particular queue of the output buffer.

In accordance with another aspect of the invention, the point when the storage remaining available for a particular queue in the output buffer being transmitted to the network has become equal to storage capacity of FIFO memory is detected. In response, the controller resumes transfer of data from the system memory to the FIFO memory.

Preferably, detection is carried out by detecting when the storage remaining available for a particular queue in the output buffer being transmitted to the network exceeds the storage capacity of the FIFO memory. In response, additional data is transferred from the system memory to the FIFO memory.

In the preferred embodiment, the FIFO memory is a physical single FIFO memory and the output buffer queues are configured as a plurality of logical FIFO memories.

In accordance with another aspect of the invention, a plurality of buffers are established at arbitrary locations in the system memory. Each buffer is formed of a plurality of contiguous locations in the system memory for storing frames of data having a particular priority, and established in the system memory are a plurality of descriptor rings pointing respectively to the plurality of buffers.

Still other objects and advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTION OF THE DRAWINGS

FIG. 5 is a more detailed diagram of the medium access controller shown in FIG. 4.

FIG. 6 is a diagram showing data flow carried out in the network interface.

FIG. 9 is a diagram showing a buffer memory transmit queue.

FIG. 10 is a flow chart showing how data to be transmitted on the network is moved from the system memory.

FIG. 11 is a diagram of transmit packets queued in the buffer memory.

FIG. 12 is a flow chart showing how data received from the network is moved to the system memory.

DETAILED DISCLOSURE OF A PREFERRED EMBODIMENT

Although the invention has general applicability in the field of data queue manipulation, a particular utilization contemplated is in an FDDI network. Accordingly, whereas the Disclosure of this invention will be made in the field of FDDI, it is to be understood that the invention is not to be so limited.

FDDI

Some background information on FDDI, helpful to obtain an understanding of the invention in that environment, is now provided.

"Fiber Distributed Data Interface" (FDDI), based on fiber optic components and systems, and developed by the American National Standards Institute (ANSI)

Figure 1:
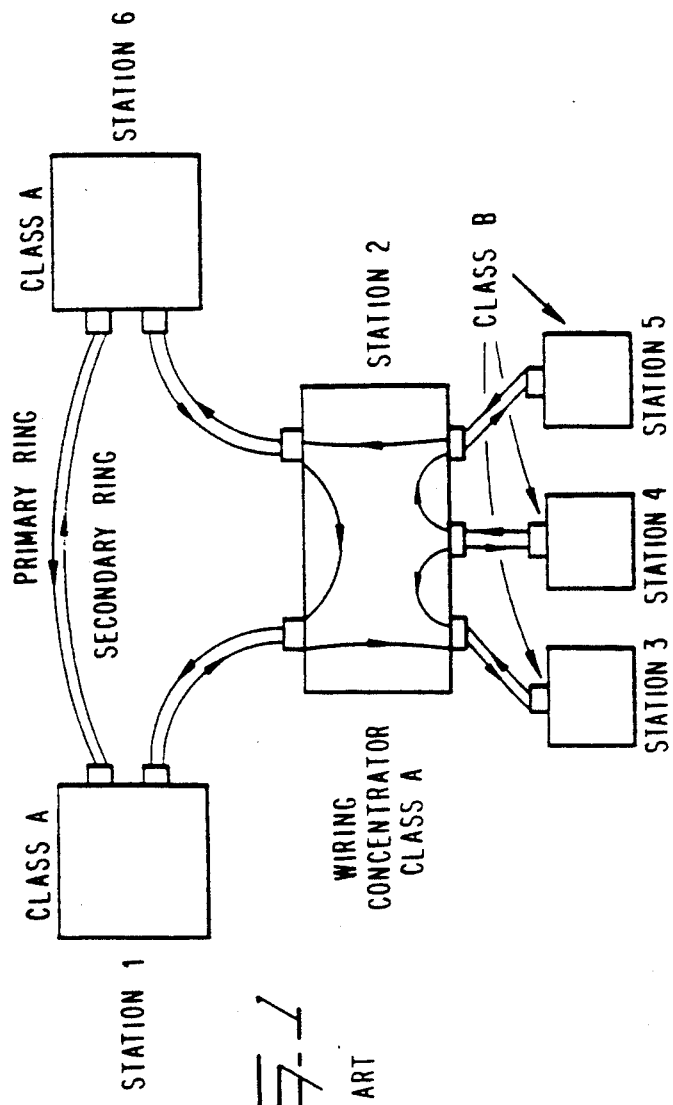
FIG. 1 is a block diagram of a typical implementation of an FDDI network of a type known in the prior art.

X3T9.5 Committee, defines a 100 megabit per second, timed-token protocol implementing dual counter-rotating physical rings. FIG. 1 is a simplified block diagram of an FDDI ring composed of a variety of station types. Class A stations, sometimes referred to as "dual attachment stations", are connected both to the primary and secondary rings of the network. Data flows in opposite directions on the two rings, as indicated by the arrows. The Class A stations can act as a wiring concentrator, serving to connect several single-attachment, or Class B, stations to the ring. In FIG. 1, station 2 is a wiring concentrator for stations 3, 4 and 5; concentrators provide the network administrator with a single maintenance point for a large number of stations. Data transferred between stations is in the form of framed packets.

Figure 2:
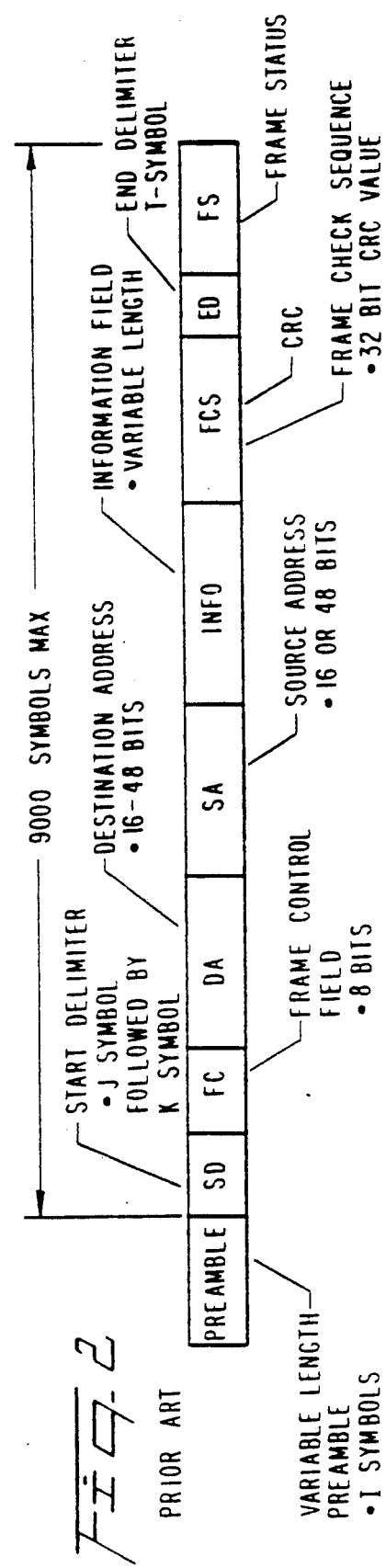
FIG. 2 is a diagram showing the format of an FDDI packet.

The format of an FDDI packet is shown in FIG. 2. Packets are preceded by a minimum of 16 idle control symbols (preamble). Packets begin with a start delimiter (SD) composed from the J and K control symbols of the 4B/5B code, well known in the art. This is followed by a two-data-symbol frame control (FC) field that identifies the type of packet. The destination address (DA) identifies the intended recipient of the packet. Likewise, the source address (SA) identifies the sender of the packet. Addresses can be either 16 or 48 bits in length. The DA field can point to a single station, a group of stations, or all stations on the ring.

Following SA comes the variable length information field. A frame check sequence (FCS) field contains 4 bytes of data. These data are the result of a 32 bit Autodin II cyclic redundancy check polynomial. The FCS insures data integrity of the FC, DA, SA, INFO and PCS fields.

Following the FCS field, an end delimiter (ED) formed with the T symbol is transmitted. The frame status (FS) field is used for symbols that determine whether the packet was received with error, if the address was recognized, or whether the packet was copied.

Figure 3:
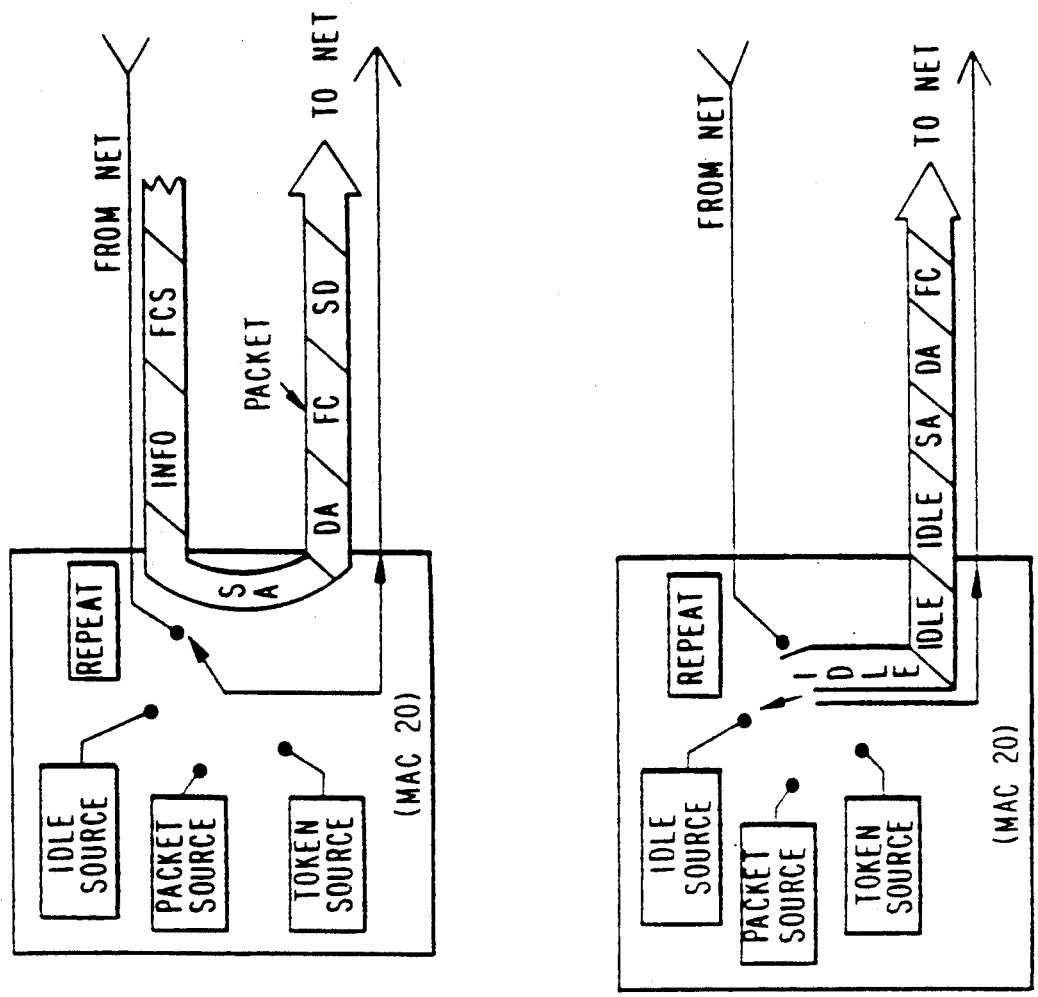
FIGS. 3(a) and 3(b) are diagrams showing operation of the MAC sublayer in FDDI specifications.

Packets are removed from the FDDI by the originating station. In this process, called "stripping" and shown in FIGS. 3(a) and 3(b), a medium access controller (MAC) 20 selects a source of IDLE control symbols for transmission on the ring. When a start delimiter arrives, the controller switches to a repeat path. The packet is monitored, copied if required, and simultaneously repeated. The medium access controller 20 also can switch to source its own packets or issue a token.

In token-passing, stations distribute the right to transmit on the medium by circulating a "token", which is a special bit pattern that assigns the right to transmit to the station that receives it. A station that wishes to transmit waits until it receives the token from the previous station in the token-passing order. When the station receives the token, it transmits its data, then passes the token to the next station.

An FDDI station waiting to transmit must first "capture" the token by performing the stripping action. Only the token SD field is repeated on the ring. Once the token is captured, the station can begin transmitting packets. When the last packet is sent, the station immediately follows by issuing a new token.

The rules for capturing the token and the amount of time allotted for data transmission are governed by "timed token protocol" defined in FDDI specifications and summarized in copending application (3), supra, and incorporated herein by reference. The protocol is designed to guarantee a maximum token rotation time (TRT), decided in a bidding process among stations during a Claim process on initialization. The bidding process allows the station requiring the fastest time between token arrivals to dictate a target token rotation time (TTRT) for the ring.

Timed token protocol offers two types of transmission service, namely, synchronous service and asynchronous service. Stations are given a predetermined amount of transmission bandwidth on each token rotation with synchronous service; the remaining ring bandwidth is shared among stations using asynchronous service. Stations are allowed to send asynchronous transmission when the token service arrives earlier than expected. The amount of time allotted for asynchronous transmission is limited to the difference between the actual time of arrival by the token and the expected token arrival time. The allotment of bandwidth for asynchronous transmission is dynamic, with any unused bandwidth for synchronous transmission being automatically reallocated for asynchronous transmission on a token rotation.

Figure 4:
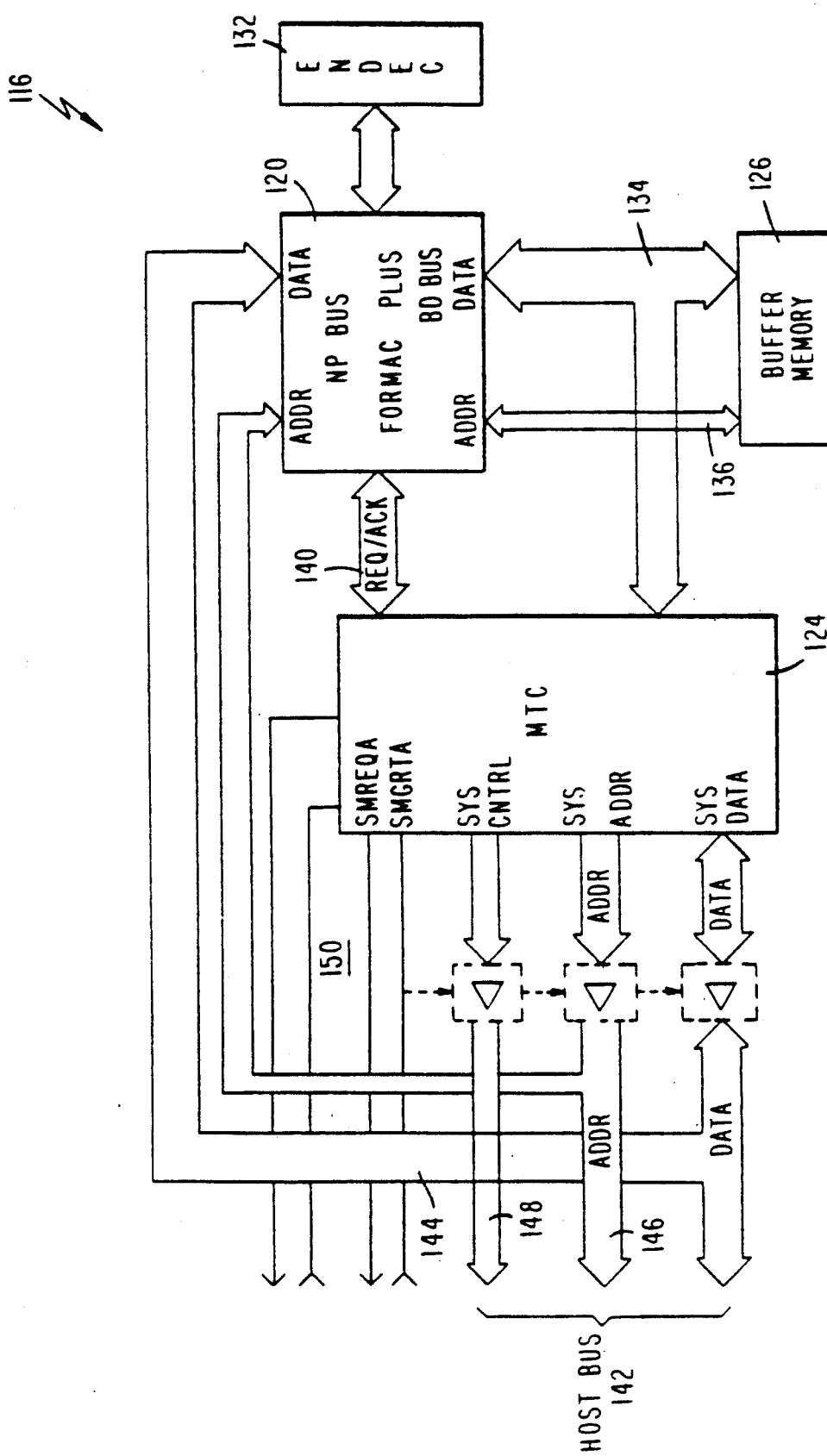
FIG. 4 is a block diagram of an implementation of the network interface, with separate node processor and host.

With reference to FIG. 4, in an FDDI interface of a type described in more detail in copending application (2), supra, for "Memory Management System and Method", a master bus architecture, shown generally as 116, is provided between a system, or user, bus and a network in the form of a fiber optic medium. The principal components of the bus master architecture 116 comprise a medium access controller (MAC) 120 for accessing the medium through an encoder/decoder (ENDEC) 132 that receives data frames from controller 120 and performs appropriate encoding of the frames before converting the data from parallel to serial format and carrying out other "housekeeping" functions to satisfy FDDI requirements. A network DMA (direct memory access) controller 124 controls transfer of data between at least one system memory (not shown) on the system bus and an output buffer 126, configured to have at least one FIFO (first in-first out) memory, connected between the network DMA controller and the medium access controller. The medium access controller 120 implements proper network access protocol, receiving and transmitting frames of data while carrying out any required housekeeping functions such as frame stripping, error checking and bus arbitration. The network DMA controller 124 operates as a front end bus master, communicating with the host or node processor together to scatter and gather data from and among system memories and the buffer while minimizing movement of data in the memory.

The medium access controller 120, shown in FIG. 5 and described in more detail hereinafter, is interfaced to buffer memory 126 through a data bus 134 and an address bus 136, and to the network DMA controller 124 through data bus 134. Handshaking is carried out between the controllers 124 and 120 on a bus 140 to control movement of data to and from the medium.

The network DMA controller 124 resides on a host bus 142 comprising a shared data bus 144 and address and control busses 146, 148. Arbitration signals to the network DMA controller 124 are interfaced to the host on bus request and acknowledgement lines 150. Medium access and network DMA controllers 120 and 124, together with output buffer memory 126, cooperate to carry out network interface operations on the various busses shown, as described hereinafter, and in detail in copending application (1), supra, incorporated herein by reference.

Figure 7:
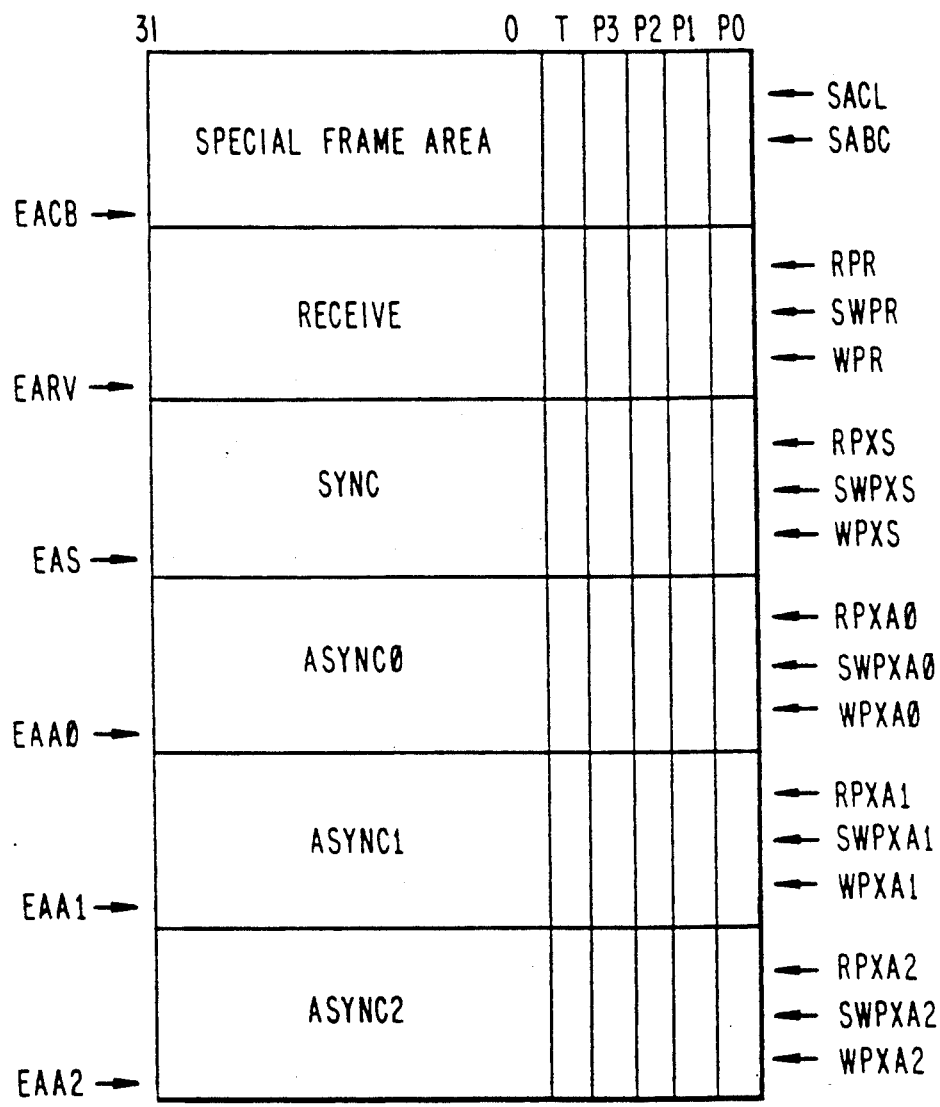
FIG. 7 is a diagram showing the organization of the buffer memory in queues implemented in the network interface.

Referring to the block diagram of FIG. 6, the output buffer 126, shown in detail in FIG. 7 and described in more detail hereinafter, is configured to have a receive FIFO 175 containing a queue of data received from the medium and at least one, but preferably four, transmit FIFOs 177 each containing a queue of data to be supplied to the medium. Four queues are shown in FIG. 7 to represent one synchronous queue and asynchronous queues containing data having three different assigned levels of priorities in accordance with FDDI specifications. The output buffer 126, which preferably is a static random access memory (SRAM), is programmed by firmware to have four FIFOs each containing a data queue of a different priority; specifically each FIFO is defined using pointers in a conventional manner.

Data received from the medium is supplied by the network DMA controller 124 to the system memory through link list queues 178, and similarly, data is transmitted to the medium from the system memory through link list queues 180 that correspond to the synchronous and three levels of asynchronous priorities. Reference is made herein to copending application (2), supra, for "Memory Management System and Method", incorporated herein by reference, for details on buffer memory management implemented in this system.

Prior to any operation involving the output buffer 126, the node processor must load into the buffer the end addresses of all the queues. Queue pointers are in the order shown in FIG. 7, i.e., pointers define first the end of a special frame area, then a receive queue and next transmit queues in the order of sync queue followed by three levels of priority of asynchronous queues. Also programmed by the node processor are the read/write pointers of all queues being used, as shown in the right hand column of FIG. 7; end address pointers are shown in the left hand column of the figure.

How the network access and network DMA controllers 120, 124, together with buffer memory 126, cooperate to carry out network interface operations on the various buses shown, shall be described hereinafter. For the present, a more detailed description of the principal components of the interface, viz., the network DMA controller 124, medium access controller 120 and output buffer 126, will now be given.

Network DMA Controller 124

Figure 8:
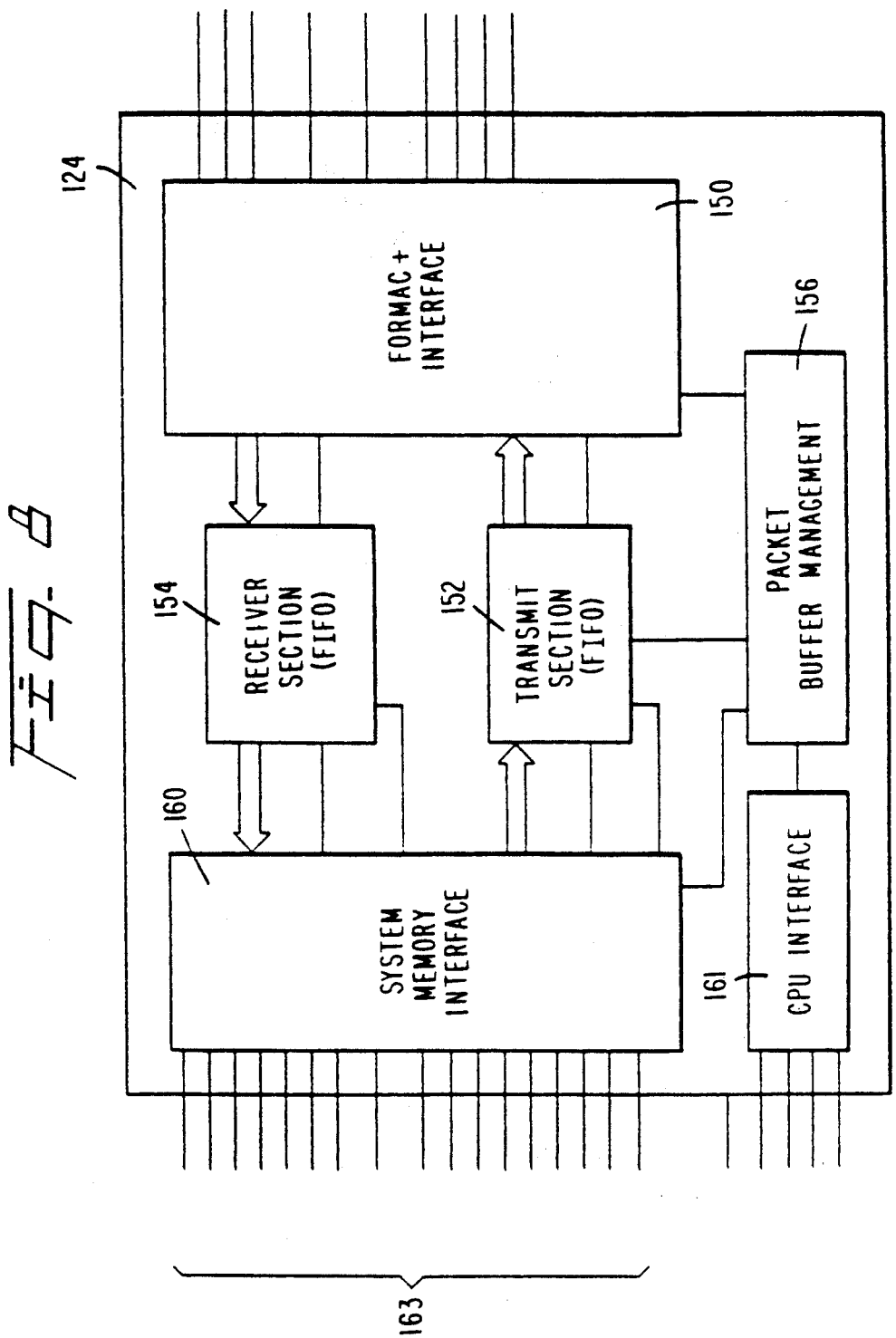
FIG. 8 is a more detailed diagram of the network DMA controller in the network interface architecture shown in FIG. 4.

The network DMA controller 124, shown in detail in FIG. 8, comprises an interface circuit 150 connected between the medium access controller 120 and the network DMA controller 124. The interface 150 communicates with a transmit section containing at least one, and preferably four, FIFOs 152, a receive section 154 containing a FIFO, and a packet buffer management circuit 156. The interface 150 transfers data stored in the transmit section 152 to the output buffer memory 126 as well as transfers data from buffer 126 to receive section 154. Transfers of data from the buffer 126 to the receive section 154 are made on command by the medium access controller 120 when data on the network is available to the system and other conditions are satisfied; transfer of data from transmit section 152 are carried out when data from the system memory is available in the transmit section, the data queue therein is unlocked and other conditions are satisfied.

Packet buffer management circuit 156 indicates to the medium access controller 120 what type of data is present in the transmit section, so as to load the buffer memory in appropriate queues depending on the priority of data in accordance with FIFO specifications. If a queue becomes full, the interface 150 signals the packet buffer management circuit 156 to lock that queue to finish emptying the current FIFO and to suspend that queue; if a transfer is incomplete, the circuit 156 continues with other pending transfers until 150 signals that the queue becomes unlocked. At that time any suspended transfer is continued. If transmit and receive data are requested from the FIFOs in sections 152 and 154 at the same time, the interface 150 prioritizes these transfers based on the sequence of events in accordance with a predetermined transmit and receive priority order.

The packet buffer management circuit 156 decodes command word codes, transmits, requests clear error commands and sends appropriate information to the system memory interface 160 as well as to transmit section 152. The packet buffer management circuit 156 prioritizes command requests, transmit requests from FIFO 152 and receive requests from FIFO 154. The management circuit 156 then issues commands to a system memory interface 160 to grant either transmits or receives or to process one of the commands, and is interfaced to the system through CPU interface 161.

Transmit section 152 maintains all transmit queues and prioritizes operations in a predetermined priority. The FIFO 152 carries out byte ordering and data gathering, and formats the data into FIFO oriented packets to be processed by the medium access controller 120. Various transmit queues in the transmit section 152 are controlled, so that when the buffer memory 126 fills up a queue, queue switching is carried out. All necessary information for the locked queue is stored so that operation can be resumed when the queue becomes unlocked.

The FIFO included in the transmit section 152 is also used for data buffering and rate adaptation between system memory interface 160 and network access control interface 150. Buffering is required in the network DMA controller 138 because data transfer rates on the system memory bus and on the network are independent.

Receive section 154 receives FIFO oriented frames from output buffer memory 126 and scatters them into receive buffers in the system memory. The receive buffers are pointed to by descriptor rings. The section 154 further contains a FIFO to provide rate adaptation between the network and system memory in the same manner as the transmit FIFO 152.

System memory interface (SMI) 160 comprises a high speed programmable bus interface, address generation circuitry and storage for the system memory. The interface 160 also contains end-of-ring detection circuits for buffer management in the system memory, and a primary control state machine for the system memory interface.

Signals supplied from the system memory interface 160 at lines 163 to the system are synchronous with a system clock SCLK (not shown). These signals request access of one system memory from an external arbiter (not shown). Another signal grants the network DMA controller 124 the right to access the system memory. An address bus at the output of SMI 160 addresses all system memory accesses, and a system memory read/write line indicates whether data is being transferred from the system memory to controller 124 or from the controller to the system memory. Other signals at the output of SMI 160 indicate status of the system memory, indicate errors, and enable or disable external data buffers to prevent bus contention between reads and writes to system memory. Another SMI signal activates a latch in the SMI to latch data to the system memory for a write operation.

Signal lines at CPU interface 161 include a signal indicating that the network DMA controller 124 must read a command from memory and directing the controller to carry out the memory access. Another line signals the CPU that the network DMA controller has written a new status word in memory, and another deasserts the interrupt.

At the output of the interface 150 are a host request bus that contains encoded requests to access buffer memory 126 through the medium access controller 120. Depending on the code carried on the host request bus the buffer memory 126 is accessed to read data or to write data in any of four transmit queues. The read request retrieves receive packets from the buffer 126 and stores them in system memory. Write requests transfer packets into buffer memory for transmit. Also at the output of the interface 150 is a host acknowledge line carrying a signal indicating that the present write or read request of the network DMA controller 124 is being granted by the medium access controller 120. Together with this signal, buffer memory 126 is enabled, and data is present on a data bus, data parity bus and data tag bus, to be described hereinafter. The interface also provides a read output to latch data into the network DMA controller 124 when the medium access controller 120 reads data from buffer memory 126 into the DMA controller. A received data line indicates that received data is present in the buffer 126 and is ready to be transferred to the system memory. Other lines, to be described hereinafter, indicate the status of the currently accessed transmit queue in buffer 126.

Medium access controller 120

Medium access controller 120, shown in more detail in FIG. 5, comprises a core medium access control (MAC) 162 for handling FDDI MAC protocol. The data I/O port of MAC 162 is connected to transmit and receive FIFOs 164 and 166. Data received from the network is supplied by the receive FIFO 166 to the external buffer memory 126; data from the external buffer to be supplied to the network is stored in transmit FIFO 164. A FIFO control circuit 168 coordinates loading and unloading of the transmit and receive FIFOs 164 and 166 based on memory arbitration decisions made by a memory arbiter 170.

An address generator 172 supplies required external buffer memory addresses on address bus 136 based on the access decision of the arbiter which determines whether the network or the node processor can access the buffer memory. A node processor interface 174, whose data input is controlled by address generator 172 via gate 173, decodes instructions from the node processor, collects chip status and distributes control information throughout the controller 124.

The transmit and receive FIFOs 164 and 166, on-chip with medium access controller 120, store a number of data packets depending primarily on the latency of the system bus and burst length, in a manner similar to the transmit and receive sections 152 and 154 of the network DMA controller 124.

Buffer Memory 126

The output buffer memory 126, shown in detail in FIG. 6, is configured to have a receive FIFO 175 containing a queue of data received from the network and at least one, but preferably four, transmit FIFOs 177 each containing a queue of data to be supplied to the network. Four queues are shown in FIG. 7 to represent one synchronous queue and queues containing three levels of asynchronous priorities of data in accordance with FDDI specifications. How the data priorities are related to each other and are supplied to the network are detailed in copending applications (3) and (4), supra, incorporated herein by reference.

The format of the transmit frames, shown in FIG. 9, consists of data at bit positions 0-31 and a tag bit (T) and followed by a descriptor word. The last word of each frame as well as a descriptor word has the tag bit set to "1", demarking the end of the frame. Packets to be transmitted are set up in the system memory by the host or node processor.

The transmission procedure is shown in overview in FIG. 10 in four principal steps. Following set-up of data in the system memory, in step 182, if the current transmit queue in output buffer 126 is determined not to be "almost full", in accordance with the invention, the network DMA controller 124 transfers (step 184) the data from the system memory to its internal transmit FIFO 152 shown in FIG. 8. The data next is transferred from the transmit FIFO 152 to (external) output buffer memory 126 (step 186) and then, by the medium access controller 120, from the buffer 126 to the network (step 188). Transmit packets queued in the buffer 126 are shown in FIG. 11.

Loading of Transmit Frames In Buffer Memory

The format of the transmit frames shown in FIG. 9 are loaded by the host and network DMA controller 124 into the buffer memory 126 under control of the medium access controller 120. This is carried out in response to a request by the network DMA controller 124 to write data to the buffer 126, encoded based on the particular queue being requested. Packets preferably are loaded into the buffer 126 at the same time that the buffer is being unloaded for transmission so as to maximize bus utilization efficiency and avoid overrun or underrun conditions, as described in copending application (2), supra.

Unloading of Transmit Frames from Buffer Memory

After a frame has been completely located into the buffer memory 126, determined by the medium access controller 124, when either it has been confirmed that an entire frame is loaded or that the number of words of the frame written into the memory exceeds a transmit threshold, as described in copending application (3), the frame is ready for transmission to the network.

When a transmission to the network is available to the system, i.e., a token on the FDDI network is captured for transmitting a queue and transmission conditions for that queue are satisfied, transmission begins and the frame is read by the medium access controller 124 until the end of the frame, characterized by a logic "1" tag-bit, is encountered. At this time, frames of data are already being read into the buffer for subsequent transmission, before the buffer is emptied, as described in copending application (2), supra. That is, while transmission is in progress and after complete transmission of a frame, the medium access controller 124 fetches more data from the selected queue of the FIFO into its on-chip transmit FIFO 164 for transmission if a complete frame is in the buffer or if the content of the buffer exceeds a preprogrammed frame threshold value. If neither condition is satisfied, the medium access controller 124 checks other queues, in order of priority, for transmission.

Transmission from a queue is completed when the queue is emptied. However, if the transmit FIFO 164 empties in the middle of a frame, an underrun condition is implied, and the current frame is aborted.

Queues of transmit data stored in the buffer memory have the format shown in FIG. 11, wherein each frame contains long words characterized by a tag bit "0" and a last long word characterized by a tag bit "1". Following the last word of the packet is a status word also characterized by the tag bit "1". The status word reflects the status of the data buffer as well as the status of the packet including a number of predetermined bits, bits defining at which byte boundary the last word of data ends, bits copied from the status that the network DMA controller obtains from the system memory and a bit indicating whether the packet contains an error and should be aborted.

Loading of Receive Packets in Buffer Memory

Figure 13:
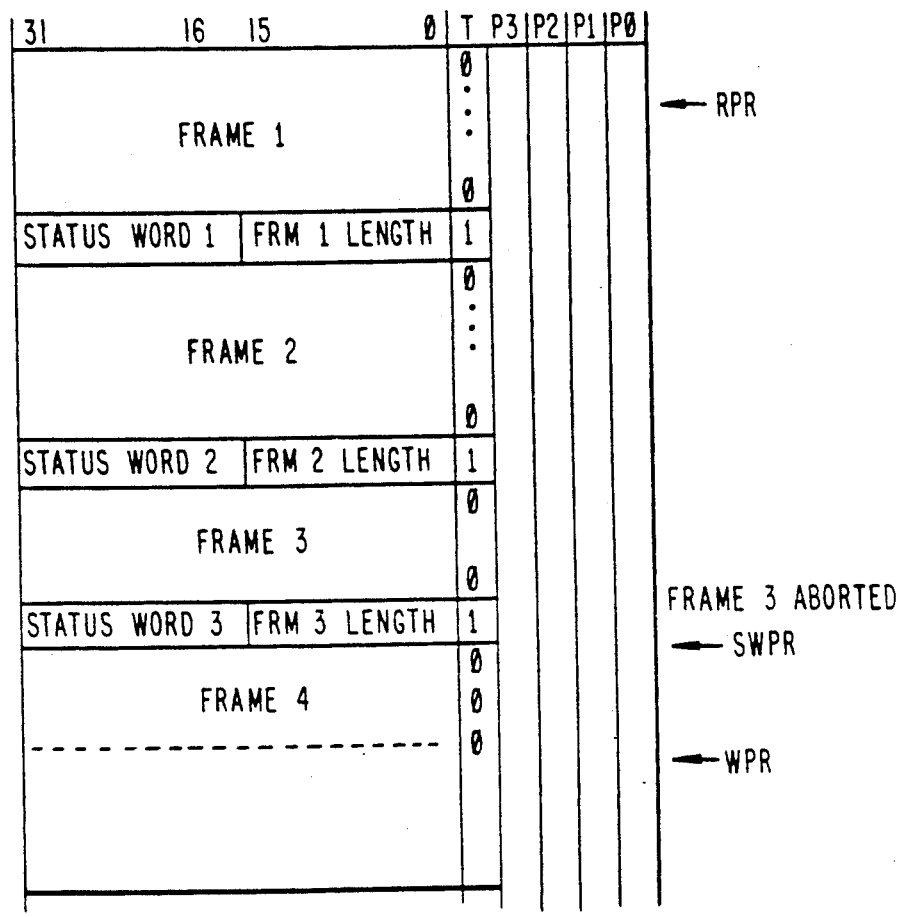
FIG. 13 is a diagram showing the structure of a buffer memory receive queue.

Reception of packets, shown in overview in FIG. 12, requires reception of data packets by the medium access controller 120 (step 190) for storage in external buffer memory 126 (step 190), and transfer of the packet data from the buffer to the internal receive FIFO 154 of network DMA controller 124 (step 192). The network DMA controller 124 then transfers the packet data from the internal receive FIFO 154 to the system memory (step 194) to be processed by the host or node processor (step 196). The format of receive frames stored in the buffer memory 126 is shown in FIG. 13.

Figure 14:
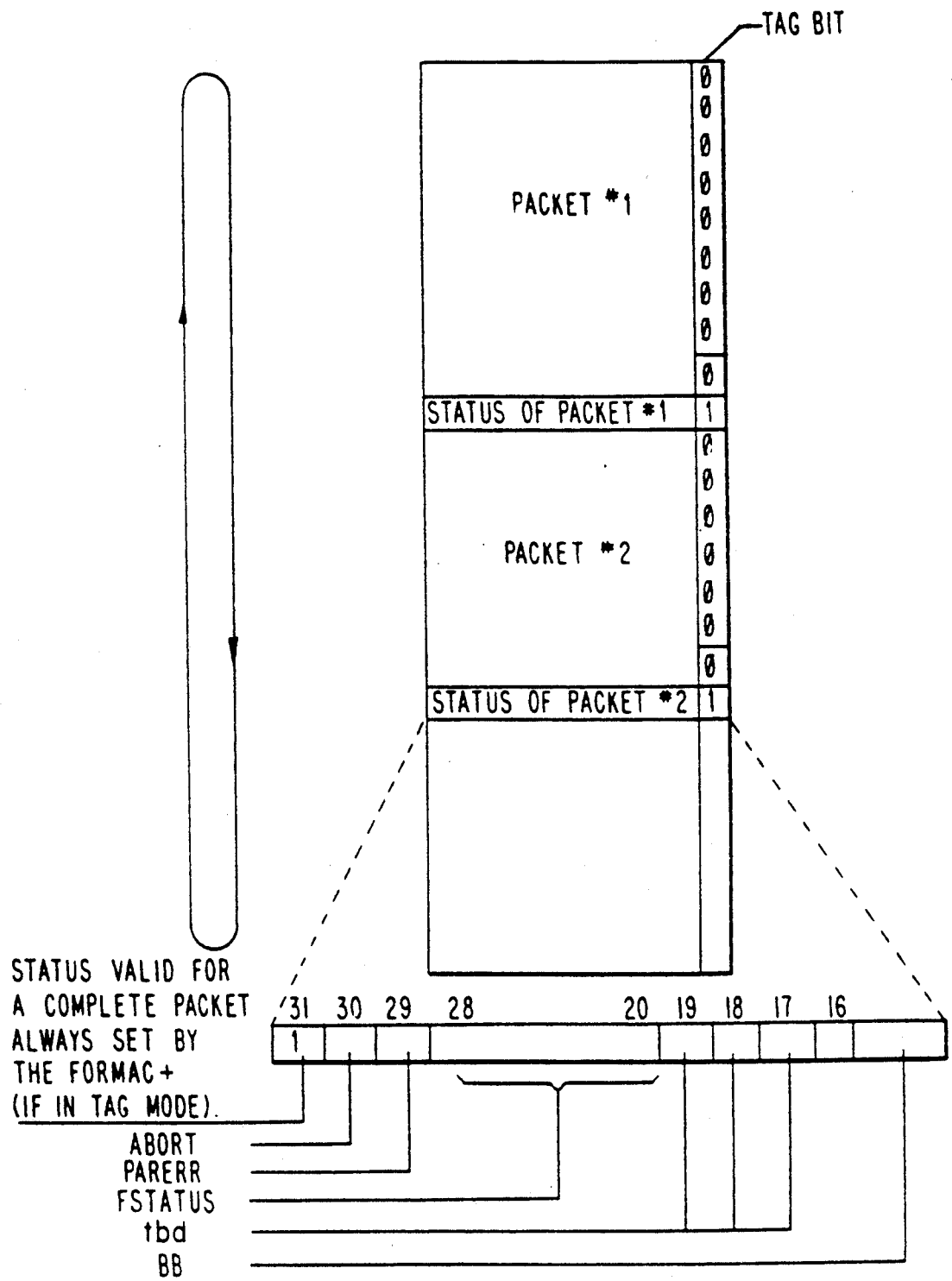
FIG. 14 shows the format of receive packets stored in the buffer memory.

Packets received from the network stored in buffer memory 126 by the medium access controller 120 are arranged in the memory in the manner shown in FIG. 14. The receive packets in the buffer memory thus are stored contiguously one after the other, causing the buffer memory receive area to have the configuration of a circular queue. At the end of each packet, the medium access controller 124 stores the status of the packet. The tag bit is set to 0 for data and to 1 to identify the status word.

Unloading of Receive Frames from Buffer Memory

The medium access controller 120 controls the network DMA controller 124 to transfer data from the buffer memory 126 into the system memory. This takes place when the number of words in the buffer memory exceeds programmed threshold or contains a complete frame, as described in application (3), supra. Any overflow condition of the receive buffer queue during frame reception is indicated by the status word, indicating that the frame should be aborted.

Network Access and Network DMA Controller Interfacing

Figure 15:
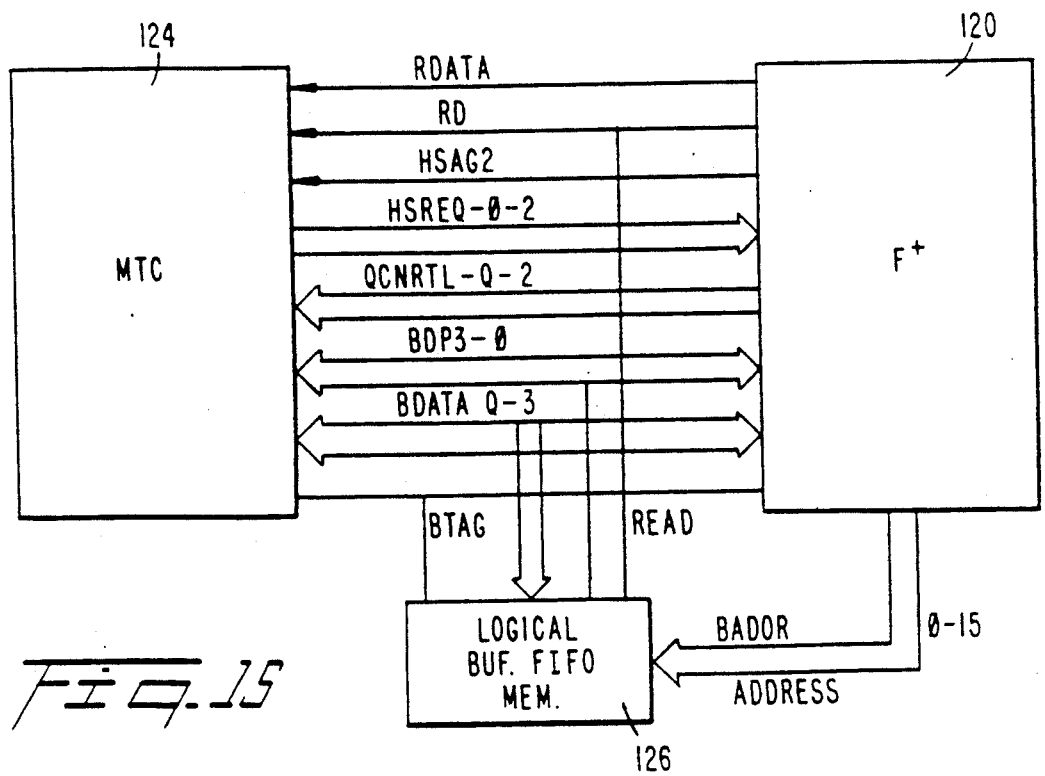
FIG. 15 is a diagram showing flow of signals among the medium access controller, the network DMA controller and the buffer memory.

FIG. 15 shows the signal flow paths among medium access controller 120, network DMA controller 124 and buffer memory 126. A buffer data bus BDATA, connected between medium access controller 120 and network DMA controller 124 as well as to buffer 126 preferably is a 32 bit bus, and an additional line BTAG carries the tag bit defining whether the BD bus contains frame data or frame status at the end of frame. The bus BDP carries buffer memory data parity bits for the BD bus and the BDTAG bus. All three of these buses, namely, BDATA, BTAG and BDP, are applied to buffer memory 126. Also applied to buffer memory 126 is an address bus BADDR that carries an address applied by the medium access controller 120, which preferably is a 16 bit address.

Signals required for transmitting to the network are supplied in any of a number of different queues, depending on priority as described in copending application (3) supra, determined by the data on a control bus QCNTRL. To increase the operating speed of the interface, the control bus QCNTRL also indicates to the network DMA controller 124 that a queue that was previously full now is ready to accept additional data, in a manner described in copending application (4) for "Configuration of SRAMS as Logical FIFOs for Transmission and Reception of Packet Data", supra, incorporated herein by reference.

Also carried by the QCNTRL bus is data indicating transfer condition of data to any one of the queues, viz, the sync queue and the three levels of asynchronous queues, to transfer data to the medium. The transfer conditions provided by the medium access controller 120 informs the network DMA controller 124 that controller 120 has the token and is currently is transmitting that particular queue from buffer memory 126 to the medium.

A bus HSACK (host acknowledge) carries a signal indicating that a present network DMA controller write or read request is being granted by the medium access controller 120. Together with this signal, buffer memory 126 is enabled, and data is present on BD (bus data), BDP (bus data priority) and BDTAG buses.

RDATA is asserted when the medium access controller 120 has stored received data from the network into buffer memory, to be transferred by the network DMA controller 124 into system memory. In response, the network DMA controller requests access to the bus, which is acknowledged by the medium access controller 120. The medium access controller 120 stores network data in buffer memory 126 at the address specified by data on the BADDR bus, and the data stored in buffer thereafter is transferred to the network DMA controller 124, in response to an assertion by the medium access controller 120 of the READ terminal of the buffer.

Further details on the "handshaking" that takes place between the network DMA controller 124 and medium access controller 120 on the buses just described, are L given in copending application (1), supra, at FIGS. 17–20 and corresponding text, incorporated herein by reference.

Handling of Multiple Priority Data through Single FIFO

Figure 16:
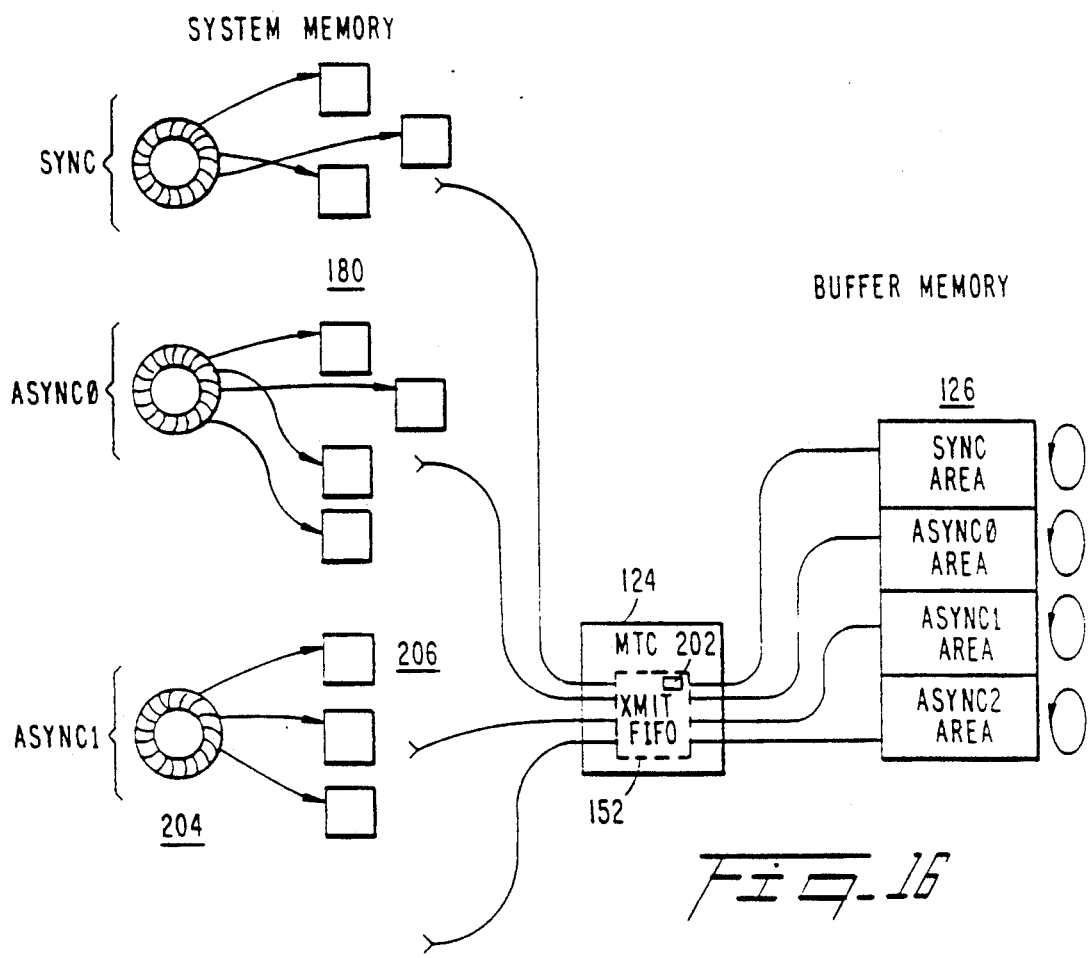
FIG. 16 is a diagram showing flow of multiple priority data from the system memory to output buffer through a single FIFO.
Figure 17:
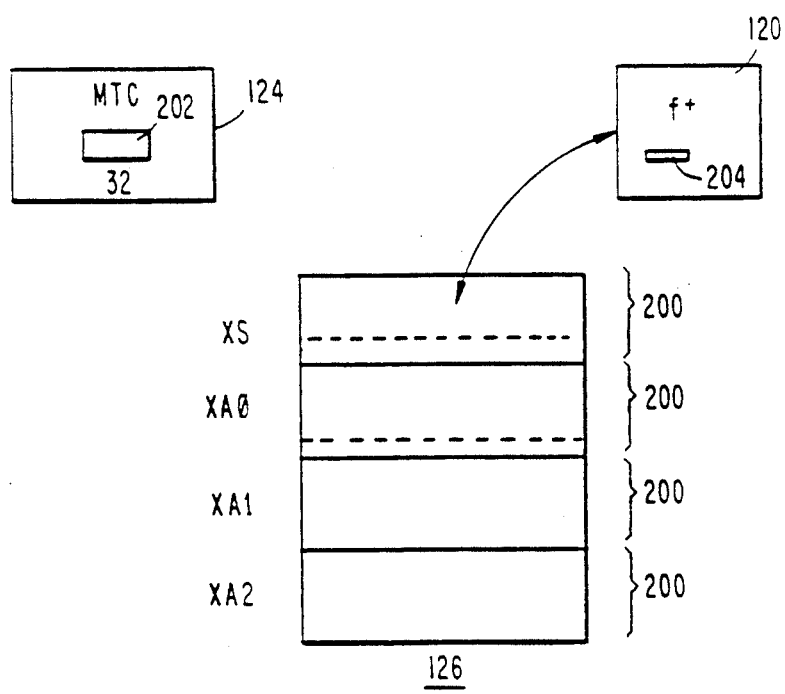
FIG. 17 is a diagram showing operation of the medium access controller and network DMA controller as data is sent through the single FIFO to the output buffer.

In accordance with the invention, and as shown in FIG. 16, the sequence of transferring data, stored in separate queues in the system memory, depending on a level of priority, to corresponding queues in output buffer 26, pass through a single physical FIFO memory in network DMA controller 124. The single physical FIFO is incorporated in transmit section 152, as shown in FIG. 8. The physical FIFO, identified as 202 in FIG. 17, can be sized to have any predetermined data storage capacity. In the present example, it is assumed that the predetermined data storage capacity of the physical FIFO 202 is 32 bytes.

In the embodiment described, and as discussed in more detail in copending applications (2) and (4), supra. incorporated herein by reference, each priority has its own descriptor ring 204 pointing to corresponding buffer regions in the system memory, as shown in FIG. 16, and at the output buffer memory 126 side, the priority has its own circular queue. On the other hand, all data of different priorities are transferred from the system memory to the output buffer 126 through the same FIFO 202, within transmit section 152 of the network DMA controller 124.

Thus, synchronous data is transferred, through FIFO 202, to the corresponding queue in output buffer 126 for synchronous data. Synchronization of the output buffer 126 to contain this area is carried out using pointers as described previously in connection with FIG. 7. If any synchronous data is available to be transmitted to the network upon receipt of the token, in accordance with FDDI specifications, the synchronous data will be transferred first.

Thereafter, asynchronous data having priority level 0, which is defined as being the highest level of priority, is transferred, through the FIFO 202, to the corresponding queue in output buffer 126.

Thereafter, data having other levels of priority are transferred in succession from the system memory, through the same FIFO 202, to corresponding regions in output buffer 126, as shown in FIG. 16. It is to be understood, however, that the signal flow paths in FIG. 16 take place in succession, so that data of only one queue at a time will pass through the FIFO 202.

To prevent locking up of the single FIFO 202, a register 204 in the medium access controller 120 (see FIG. 17), termed "almost full" register, monitors the amount of storage remaining available in any particular queue. At the amount of space remaining available in that particular queue, currently being transferred to the output buffer 126, becomes no greater than the storage capacity of physical FIFO 202, the medium access controller 120 controls the network DMA controller 124 to stop transferring transmit data from the system memory to the FIFO 202. That is, the network DMA controller 124 stops requesting data in the current queue, and the medium access controller 120 empties the FIFO 202. The FIFO 202, being exhausted of any residual data, will not lock up, or block, additional data having a different priority that would thereafter be requested by the controller 120.

At this time, the network DMA controller 120 will begin sending data having a different priority, through FIFO 202, to the output buffer 126. Because the FIFO 202 is clear, there is no interruption of data flow to the network.

The amount of data storage remaining available in any queue of output buffer 126 is determined, by the medium access controller 120, by comparing the locations of the read and write pointers defining the logical FIFO containing that queue, in a conventional manner.

To prevent "underrunning" of the FIFO 202, data is transferred from the current queue in the system memory to the corresponding queue in buffer memory 126 as soon as the queue becomes not "almost full". This enables the size of the queues in buffer 126 to be made smaller than otherwise would be required.

Handshaking between the network DMA controller 124 and medium access controller 120 during transmission of multiple priority data through the single FIFO 202 is carried out on the host request bus HSREQ, shown in FIG. 15. Referring to this diagram, the network DMA controller 124, in response to a request for transmission, transfers the highest priority pending data to output buffer 126 by using the appropriate lines of the host request bus HSREQ. In response, the medium access controller 120 acknowledges the data by asserting HSACK. Transfer continues until there is no more data of that priority to be transferred, there is higher priority data to be transferred or the queue for that priority in output buffer 126 is "almost full".

In the first two cases, the network DMA controller 124 starts loading its transmit FIFO 202 and waits for the medium access controller 120 to unload its transmit FIFO 202, and switches to the next highest priority level pending. In the latter case, the medium access controller 120 issues an "almost full" signal to the network DMA controller.

In response, the network DMA controller 124 stops loading its transmit FIFO 202, but continues unloading the FIFO to the buffer memory 126 until the FIFO is empty. Typically, this will not fill the current queue of the output buffer 126. The network DMA controller 124 then locks that priority and switches to another transmit priority level, if any are pending.

When the medium access controller 120 begins transmitting from the almost full queue, as soon as the current output buffer memory queue has fallen below the almost full threshold, the medium access controller 120 will signal the network DMA controller to unlock that queue, using QCNTRL. The network DMA controller then will finish emptying the current contents of the FIFO 202 into the output buffer 126, then begins resuming loading the FIFO from the unlocked priority descriptor.

Conclusion

By detecting the amount of storage available in the current queue of output buffer 126 and transferring data from FIFO 202 to that queue only if the data storage available is less than or equal to the storage capacity of the FIFO 202, the FIFO 202 always empties between data transfers to the current queue. Accordingly, the FIFO will not lock up with residual data when then current output buffer queue becomes almost full since it can fully empty the FIFO.

On the other hand, when the current queue becomes less than "almost full", data transfer from the system memory to the transmit FIFO 202 resumes immediately, to optimize the operating speed of the interface.

What is claimed is:

1. For a network adapter including a plurality of processors and system memory means for storing frames of data arranged in a plurality of different queues, the frames of each queue having a priority different from the priorities of frames of data of the other queues, apparatus for controlling transmission of said frames of data to a network, comprising:
   an output buffer memory configured to have a plurality of FIFO memory regions for storing respectively the plurality of queues of framed data to be transmitted to the network;
   a FIFO memory establishing a single signal flow path for said framed data between said memory means and said output buffer memory;
   means for controlling flow of said framed data, one queue at a time in order of priority, through said FIFO memory to corresponding FIFO memory regions of said buffer memory; and
   means for transmitting said framed data, stored in said FIFO memory regions of said output buffer memory, to said network.

2. The apparatus of claim 1, wherein said FIFO memory has a predetermined data storage capacity and said data flow controlling means includes means for controlling transfer of framed data from said system memory means to said FIFO memory and transfer of framed data from said FIFO memory to said output buffer memory such that said FIFO memory is always exhausted of data following every transfer of framed data from said FIFO memory to said output buffer memory.

3. The apparatus of claim 2, wherein data flow controlling means includes means for determining the amount of data storage remaining available for a particular queue of said output buffer memory currently receiving data of a particular priority to be transmitted to said network and means for transferring framed data from said system memory means to said FIFO memory only when said data storage remaining available for said particular queue is not less than said predetermined data storage capacity of said FIFO memory.

4. The apparatus of claim 2, wherein said data flow controlling means further includes
  (a) means for detecting an "almost full" condition of a particular queue of said output buffer memory receiving framed data of a particular priority when the amount of storage remaining available for said particular queue is not greater than said predetermined storage capacity of said FIFO memory, and
  (b) means responsive to said "almost full" condition for terminating transfer of data from said system memory means to said FIFO memory and for initiating transfer of data, having a different priority, from said system memory means through said FIFO memory to a different particular queue of said output buffer.

5. The apparatus of claim 2, including means for detecting when the storage remaining available for a particular queue in said output buffer being transmitted to said network has become equal to said predetermined storage capacity of said FIFO memory, said controller means including means responsive to said detecting means for transferring data from said system memory means to said FIFO memory.

6. The apparatus of claim 1, wherein said FIFO memory is a physical single FIFO memory and said queues of said output buffer are configured as a plurality of logical FIFO memories.

7. The apparatus of claim 1, including means for establishing a plurality of buffers at arbitrary locations in said system memory means, each buffer being formed of a plurality of contiguous locations in said system memory means for storing frames of data having a particular priority, and means for establishing in said system memory means a plurality of descriptor rings pointing respectively to said plurality of buffers.

8. For a network adapter including a plurality of processors and system memory means for storing frames of data arranged in a plurality of different queues, the frames of each queue having a priority different from the priorities of frames of data of the other queues, an output buffer memory configured to have a plurality of FIFO memory regions for storing respectively the plurality of queues of framed data to be transmitted to the network, and a FIFO memory having a predetermined storage capacity and establishing a single signal flow path for said framed data between said system memory means and said output buffer memory, and means for transmitting said framed data, stored in said FIFO memory regions of said output buffer memory, to said network:
  a method of controlling flow of said framed data, one queue at a time in order of priority, through said FIFO memory to corresponding FIFO memory regions of said buffer memory, comprising the steps of
  detecting a request for transmission of data to said network, and in response, controlling movement of framed data to be transmitted by
  (a) detecting storage remaining available for a particular queue of said output buffer containing data to be transmitted to said network;
  (b) transferring framed data from said FIFO memory to said output buffer memory, and
  (c) transferring framed data from said system memory means to said FIFO memory only if said storage remaining available for said particular queue is not less than said predetermined storage capacity of said FIFO memory.

9. The method of claim 8, wherein said step of controlling movement of framed data to be transmitted includes the steps of
  (a) detecting an "almost full" condition of a particular queue of said output buffer memory receiving framed data of a particular priority when the amount of storage remaining available for said particular queue is not greater than said predetermined storage capacity of said FIFO memory, and
  (b) in response to said "almost full" condition, terminating transfer of data from said system memory means to said FIFO memory and initiating transfer of data, having a different priority, from said system memory means through said FIFO memory to a different particular queue of said output buffer.

10. The method of claim 8, including detecting when the storage remaining available for a particular queue in said output buffer being transmitted to said network has become equal to said predetermined storage capacity of said FIFO memory, and in response, transferring additional data from said system memory means to said FIFO memory.

11. For a Fiber Distributed Data Interface network having a plurality of processors, each including a system memory means for storing frames of data arranged in queues and having a plurality of different transmit priorities, and an optical medium forming a digital data communication path among said processors, a network controller, comprising:
  first means implementing a timed token data protocol for accessing said optical medium;
  a random access memory forming an output buffer; and
  second means for configuring in said random access memory a plurality of queues for storing therein said queued frames of data having respectively said plurality of different transmit priorities;
  a FIFO memory establishing a single signal flow path for said framed data between said system memory means and said output buffer;
  means for controlling flow of said framed data, one queue at a time in order of priority, through said FIFO memory to corresponding queues in said buffer memory; and
  means for transmitting said framed data, stored in said queues in said output buffer memory, to said medium.

12. The network controller of claim 11, wherein said FIFO memory has a predetermined data storage capacity and said data flow controlling means includes means for controlling transfer of framed data from said system memory means to said FIFO memory and transfer of framed data from said FIFO memory to said output buffer memory such that said FIFO memory is always exhausted of data following every transfer of framed data from said FIFO memory to said output buffer memory.

13. The network controller of claim 12, wherein said data flow controlling means includes means for determining the amount of data storage remaining available for a particular queue of said output buffer memory currently receiving data of a particular priority to be transmitted to said medium and means for transferring framed data from said system memory means to said FIFO memory only when said data storage remaining available for said particular queue is not less than said predetermined data storage capacity of said FIFO memory.

14. The network controller of claim 12, wherein said data flow controlling means further includes
  (a) means for detecting an "almost full" condition of a particular queue of said output buffer memory receiving framed data of a particular priority when the amount of storage remaining available for said particular queue is not greater than said predetermined storage capacity of said FIFO memory, and
  (b) means responsive to said "almost full" condition for terminating transfer of data from said system memory means to said FIFO memory and for initiating transfer of data, having a different priority, from said system memory means through said FIFO memory to a different particular queue of said output buffer.

15. The network controller of claim 12, including means for detecting when the storage remaining available for a particular queue of said output buffer being transmitted to said medium has become equal to said predetermined storage capacity of said FIFO memory, said data flow controlling means including means responsive to said detecting means for transferring data from said system memory means to said FIFO memory.

16. The network controller of claim 11, wherein said FIFO memory is a physical single FIFO memory and said queues of said output buffer are configured as a plurality of logical FIFO memories.

17. The network controller of claim 11, including means for establishing a plurality of buffers at arbitrary locations in said system memory means, each buffer being formed of a plurality of contiguous locations in said system memory means for storing frames of data having a particular priority, and means for establishing in said system memory means a plurality of descriptor rings pointing respectively to said plurality of buffers.

18. For a Fiber Distributed Digital, Interface network having a plurality of nodes connected to an optical medium, each node having a system memory means for storing frames of data arranged in a plurality of different queues, the frames of each queue having a priority different from the priorities of frames of data of the other queues, and an interface including (1), an output buffer memory configured to have a plurality of FIFO memory regions for storing respectively the plurality of queues of framed data to be transmitted to the medium, (2) a FIFO memory having a predetermined storage capacity and establishing a single signal flow path for said framed data between said system memory means and said output buffer memory, and (3) means for transmitting said framed data, stored in said FIFO memory regions of said output buffer memory, to said medium:
  a method of interfacing said nodes and said optical medium, comprising the steps of:
  upon a token capture, accessing said optical medium and controlling movement of framed data to be transmitted to said medium by
  (a) detecting storage remaining available for a particular queue of said output buffer to be transmitted to said medium,
  (b) transferring framed data from said FIFO memory to said output buffer memory, and
  (c) transferring framed data from said system memory means to said FIFO memory only if said storage remaining available for said particular queue is not less than said predetermined storage capacity of said FIFO memory.

19. The method of claim 18, wherein said step of controlling movement of framed data to be transmitted includes the steps of
  (a) detecting an "almost full" condition of a particular queue of said output buffer memory receiving framed data of a particular priority when the amount of storage remaining available in said particular queue is not greater than said predetermined storage capacity of said FIFO memory, and
  (b) in response to said "almost full" condition, terminating transfer of data from said system memory means to said FIFO memory and initiating transfer of data, having a different priority, from said system memory means through said FIFO memory to a different particular queue of said output buffer.

20. The method of claim 18, including detecting when the storage remaining available for a particular queue in said output buffer being transmitted to said medium has become equal to said predetermined storage capacity of said FIFO memory, and in response, transferring additional data from said system memory means to said FIFO memory.

* * * * *